3,060,001
PROCESS FOR REDUCING THE ACIDITY
OF OXIDES
William Hughes, Fairfield, and Kenneth Arkless, Stockton-on-Tees, England, assignors to British Titan Products Company Limited, Billingham, England, a corporation of Great Britain
No Drawing. Filed July 14, 1959, Ser. No. 826,927
Claims priority, application Great Britain July 15, 1958
12 Claims. (Cl. 23—202)

This invention has the object of removing or substantially reducing the acidity of oxides resulting from their method of preparation. It is especially applicable to titanium dioxide pigments but it may be applied to other oxides which may be prepared in a like manner, e.g. silica and alumina.

Titanium oxide, as prepared by various processes, has a residual acidity which is undesirable. Examples of these processes are the oxidation of titanium tetrahalides, the well-known sulphate process, the hydrolysis of titanium tetrahalides, and processes wherein titanium dioxide is produced from certain titanates, e.g. sodium titanate, by acid extraction of other metal constituents present therein. The titanium dioxide pigments may be anatase or rutile and they may have been treated in known manners, in the course of preparation, with additive substances such as, for example, silicon, aluminium, zinc, sulphur or phosphorus in various forms or as various compounds.

The invention is more particularly applicable to oxides such as titanium dioxide, for example, prepared by reacting the vapour of a titanium tetrahalide with oxygen or an oxygen-containing gas. Various ways of effecting this reaction are known, amongst which we may mention particularly that which is described in British patent specification No. 761,770 according to which the vapour phase oxidation is effected in a fluidised bed of solid particulate matter.

The residual acidity to be eliminated or substantially reduced by the invention will most often be that which is probably associated with the presence of a halogen, particularly chlorine, and halogen products.

The acidic reaction may be observed when the products are admixed with certain media, particularly aqueous media, when the fluid phase exhibits an acid reaction. This residual acidity may, to a large extent, be overcome by heating to a sufficiently high temperature but not only does this involve an uneconomic high temperature treatment but quite often, associated with such treatment, there is a sintering effect which is highly detrimental as it entails subsequent uneconomic heavy duty grinding with usually consequent deterioration in colour. Methods have been described for the after-treatment of such titanium dioxide by submitting it to heat treatment with, for instance, aluminium chloride gases, but methods of this nature have proved only limited in their effectiveness in respect of the removal of acidity.

Another method of removal of the acidity is by heat treatment in the presence of water vapour but this form of treatment requires very high temperatures unless a very large proportion of water vapour is employed. That is to say, to operate at reasonably low temperatures, i.e. 300° C., it is necessary to expose the oxidic product of vapour phase reaction for at least one hour to air containing 20% by volume of water vapour. Other methods of removing residual acidity involve the addition of water to produce an aqueous suspension. Such treatments not only introduce undesirable alkaline substances which may have to be washed away subsequently or otherwise introduce water soluble compounds in the product but they also involve problems of evaporation for the purpose of drying the product after treatment.

The object of the present invention is to make it possible for removal of acidity by heat treatment to be effected more efficiently and economically. This object is achieved, according to the invention, by subjecting the oxide to a preparatory conditioning treatment which is characterised by the step of treating the oxide possessing residual acidity, whilst hot, with a boron halide (other than the fluoride) or in the presence of a halogen (excluding fluoride) with a boroniferous substance, e.g. a substance consisting of or comprising elementary boron, capable of combining with halogen under the conditions of the process. Typical boron compounds within the purview of this invention include boron-bonded bromides, chlorides and iodides. Boron salts containing oxygen which for halogenation would require an oxygen acceptor such as carbon are not included. A particularly suitable boron halide is boron trichloride and this may be used as produced by passing chlorine gas over boron carbide at elevated temperatures. It is suitably mixed with an inert gas such as nitrogen.

According to a further feature of the invention the product oxide after treatment with boron and before separation from accompanying gases and vapour (for example those produced in the vapour phase oxidation of titanium tetrachloride) may be treated with steam whereby a further improvement may be obtained in respect of the effect of the subsequent heat treatment.

The subsequent heat treatment for the removal of acidity may be carried out at a relatively low temperature such as 100–200° C. with air or with air humidified with water.

The temperature of the boron treatment according to the process of the invention should normally be not less than 300° C. but it need not exceed 750° C. although it may be higher. The higher the temperature the shorter is the period of the treatment.

The procedure of the invention may be more clearly understood by describing its application in one particular embodiment. Thus, titanium oxide particles resulting from the vapour phase oxidation of titanium tetrachloride with oxygen-containing gases and emerging from the reaction chamber entrained in the gaseous products of reaction at temperatures of the order of 1000° C. may be cooled either indirectly or directly, preferably by the latter method, to temperatures in the range 300–900° C. The gaseous suspension may be further cooled or may be separated before further cooling either by gravitational means, e.g. in a cyclone, or by filtration through filters of various types well known in the art, these methods being assisted by electrostatic, ultrasonic or other well-known devices. The titanium oxide product so obtained normally has a high acid reaction which is usually attributed to the presence of up to 0.3% of chlorine which is either adsorbed or otherwise associated with the material. This residual acidity may be observed in a variety of ways of which the following is one by which the invention may be more clearly demonstrated.

Five grams of the titanium dioxide product is shaken for 1 minute with 25 ccs. of water and the solution so obtained is tested for pH.

The solution obtained by this test on a pigment produced as so far described will normally have a pH value of about 2. It is appreciated that it is desirable that a suitable pigment should, when submitted to the above test, have a pH value greater than 4.5.

The product so produced above having a pH of 2 may be heat treated with a view to removing acidity but unless high temperatures, i.e. 500° C. or above, which effect sintering and hence ultimately deteriorate the colour, are employed, this heat treatment does not materially serve to neutralise the product.

If the production of titanium dioxide in the above manner is conducted so that the mixture derived from the reaction chamber is cooled to a temperature of 300–900° C. and then boron trichloride is admixed in the proportion 0.1–10% $B_2O_3$, preferably 0.3–5% by weight based on the titanium oxide, it is found that the product, after separation and subsequent heating in air of ordinary humidity or in more humidified air or in steam, at a temperature of 100–200° C. will have a pH value greater than 4.5 and the chlorine content will be less than 0.05% chlorine based on the weight of the oxide product.

The time of contact with respect to the boron treatment may be quite brief. At temepratures of from 700–900° C. it should last not less than .001 second but preferably not less than .1 second. If the treatment is conducted at lower temperatures the time of contact will be longer, on the other hand there is no essential upper limitation to the length of time of contact.

The subsequent heat treatment at the preferred temperature range of 100–200° C. may vary from 15 minutes to one hour or longer. Higher temperatures of treatment are not excluded but again, for economic reasons and also to avoid other changes taking place, the temperatures will not normally exceed 300° C.

The invention is more particularly described with reference to the following examples:

*Example I*

The products of vapour phase oxidation of titanium tetrachloride (the products having been produced by the reaction of titanium tetrachloride measured at the rate of 7.5 ccs. of liquid with oxygen fed at the rate of 7.65 litres per minute measured at room temperature) issuing at a temperature of 1000° C. were cooled through a silica ducting leading from the reaction chamber by normal radiation loss to a temperature of 700° C. Boron chloride vapour, obtained by passing chlorine gas at 60 ccs./min. over boron carbide at 1000° C. was mixed with 2.5 litres/min. of nitrogen preheated to 700° C. and was introduced into the aforesaid titanium oxide containing gas stream to contact and freely admix therewith.

The time of contact was about 16 seconds.

The titanium dioxide was subsequently separated from the gas stream by settling and heated in air at 110° C. for 30 minutes. The product obtained from this treatment exhibited a pH of 4.92 with a residual chlorine content of 0.03%.

By comparison, titanium dioxide produced as described in this example but without the admission of boron trichloride had initially a pH of 2.3 and a residual chlorine content of 0.13%, and when heated at 110° C. in air for 30 minutes exhibited a pH of 2.4 and a residual chlorine content of 0.12%. It would have been necessary to heat this titanium dioxide to temperatures above 400° C. for a prolonged period in order to obtain a material of similar pH and residual chlorine values to those exhibited by the boron treated material according to this example.

*Example II*

In a process identical to that described in Example I the products of the vapour phase oxidation of titanium tetrachloride were cooled to 835° C. and, at the same rate as in Example I, preheated boron trichloride and nitrogen were admitted at this temperature. The time of contact was about 32 seconds. After separating the titanium dioxide, which exhibited a pH of 2.4 and a residual chlorine content of 0.14%, it was heated in air admixed with an equal volume of superheated steam at 110° C. for 10 minutes. The subsequent pH value was 6.88 with a residual chlorine content of 0.02%.

Without the treatment with boron trichloride the titanium dioxide would have required heat treatment at 800° C. for a prolonged period in order to obtain similar pH and residual chlorine values.

*Example III*

In a process similar to that described in Example I the products of the vapour phase oxidation were cooled to 700° C. Boron trichloride, obtained by passing chlorine at 37 ccs./min. over boron carbide at 1000° C. and mixed with 2.5 litres/min. of nitrogen, was then admitted at a temperature of 700° C. The time of contact was about 4 seconds. The products were cooled to a temperature of 460° C. when a stream of nitrogen containing 2% by weight of water, equivalent to a total flow of 5.0 litres/min. at S.T.P., was admitted after being pre-heated to a temperature of 460° C. The time of contact was about 10 seconds. The titanium dioxide was subsequently settled and separated when it was found to exhibit a pH of 2.74 and contained a residual chlorine content of 0.05%. On heating in air at 110° C. for 30 minutes the pH rose to 5.64 with a residual chlorine content of 0.01%.

Whilst the process had been described with special reference to the admixture with the titanium oxide of boron in the form of a volatile halide (other than fluoride) the process is not restricted thereto and other boron products may be used in the presence of a halogen (other than fluorine) with which they will react under the conditions of treatment.

We claim:

1. A process of reducing the acidity of finely divided titanium dioxide pigment prepared by reaction of titanium tetrachloride with oxygen whereby to form a suspension of the pigment in reaction product gases which comprises contacting the titanium dioxide while in the suspension with a member of the group consisting of chlorides, bromides and iodides of boron in vapor state, said contact being conducted at a temperature at which the boron halide is in vapor state.

2. The process of claim 1 wherein the member is boron trichloride.

3. In a method of reacting titanium tetrahalide with an oxygen containing gas to produce a hot suspension of titanium dioxide in resulting reaction gases including halogen, the improvement which comprises contacting the hot suspension with a compound comprising a halide from the group consisting of chlorides, bromides and iodides of boron to thereby reduce the acidity of the titanium dioxide.

4. In a method of reducing the acidity of titanium dioxide produced by the vapor phase oxidation of titanium tetrahalide and in the form of a hot suspension of titanium dioxide in resulting reaction gases including halogen, the improvement which comprises contacting the hot suspension while at a temperature above at least 300° C. with a small effective amount of a member of the group consisting of boron chlorides, boron bromides and boron iodides.

5. In a method of reducing the acidity of titanium dioxide produced by vapor phase oxidation of titanium tetrahalide to yield a hot suspension of titanium dioxide and resulting reaction gases including halogen, the improvement which comprises contacting the suspension with a small amount of a member of the group consisting of boron chlorides, boron bromides, and boron iodides in the vapor state.

6. The method of claim 5 wherein the suspension is contacted with said member at a temperature between about 300 and 900° C.

7. The method of claim 5 wherein the quantity of said member contacting the suspension is between about 0.1 and 10 percent by weight based upon the titanium oxide in the suspension and calculated as $B_2O_3$.

8. A process of reducing the acidity of finely divided titanium dioxide prepared by reaction of titanium tetrachloride with oxygen which comprises contacting titanium dioxide suspended in gases resulting from said reaction with a member of the group consisting of bromides, chlorides, and iodides of boron in vapor state, and thereafter heating the treated titanium dioxide with a member of the group consisting of water vapor and air until the chlorine content of said titanium dioxide has been reduced.

9. The process of claim 8 wherein the member is boron chloride.

10. In a method of reacting titanium tetrahalide with an oxygen-containing gas to produce a hot suspension of titanium dioxide in the resulting reaction gases, the improvement which comprises contacting the hot suspension with a compound comprising a halide from the group consisting of chlorides, bromides and iodides of boron and thereafter heating the resulting titanium dioxide in a member of the group consisting of air and water vapor to thereby reduce the acidity of the titanium dioxide.

11. The process of claim 10 wherein the halide is a chloride.

12. In a method of reducing the acidity of titanium dioxide produced by the vapor phase oxidation of titanium tetrachloride which produces a hot suspension of titanium dioxide in gases resulting from said reaction, the improvement which comprises contacting the hot suspension at a temperature of from 300 to 900° C. with a boron halide from the group consisting of boron chloride, boron bromide and boron iodide, in an amount of from 0.1 to 10 percent by weight of the titanium dioxide in said suspension, determined as weight of $B_2O_3$ to said titanium dioxide, and thereafter contacting the treated titanium dioxide with a member of the group consisting of water vapor and air at a temperature of from about 100 to 200° C.

References Cited in the file of this patent

UNITED STATES PATENTS

| | | |
|---|---|---|
| 2,512,079 | Werner | June 26, 1950 |
| 2,823,982 | Saladin et al. | Feb. 18, 1958 |

FOREIGN PATENTS

| | | |
|---|---|---|
| 684,016 | Great Britain | Dec. 10, 1952 |

OTHER REFERENCES

Jacomson book, "Encyclopedia of Chemical Reactions," vol. 1, page 665 (1946 ed.), Reinhold Pub. Corp., N.Y.